DISCHARGE GATE OPERATING ASSEMBLY

Original Filed Dec. 9, 1957 8 Sheets-Sheet 1

INVENTOR
Orville Ingram

DISCHARGE GATE OPERATING ASSEMBLY
Original Filed Dec. 9, 1957 8 Sheets-Sheet 2
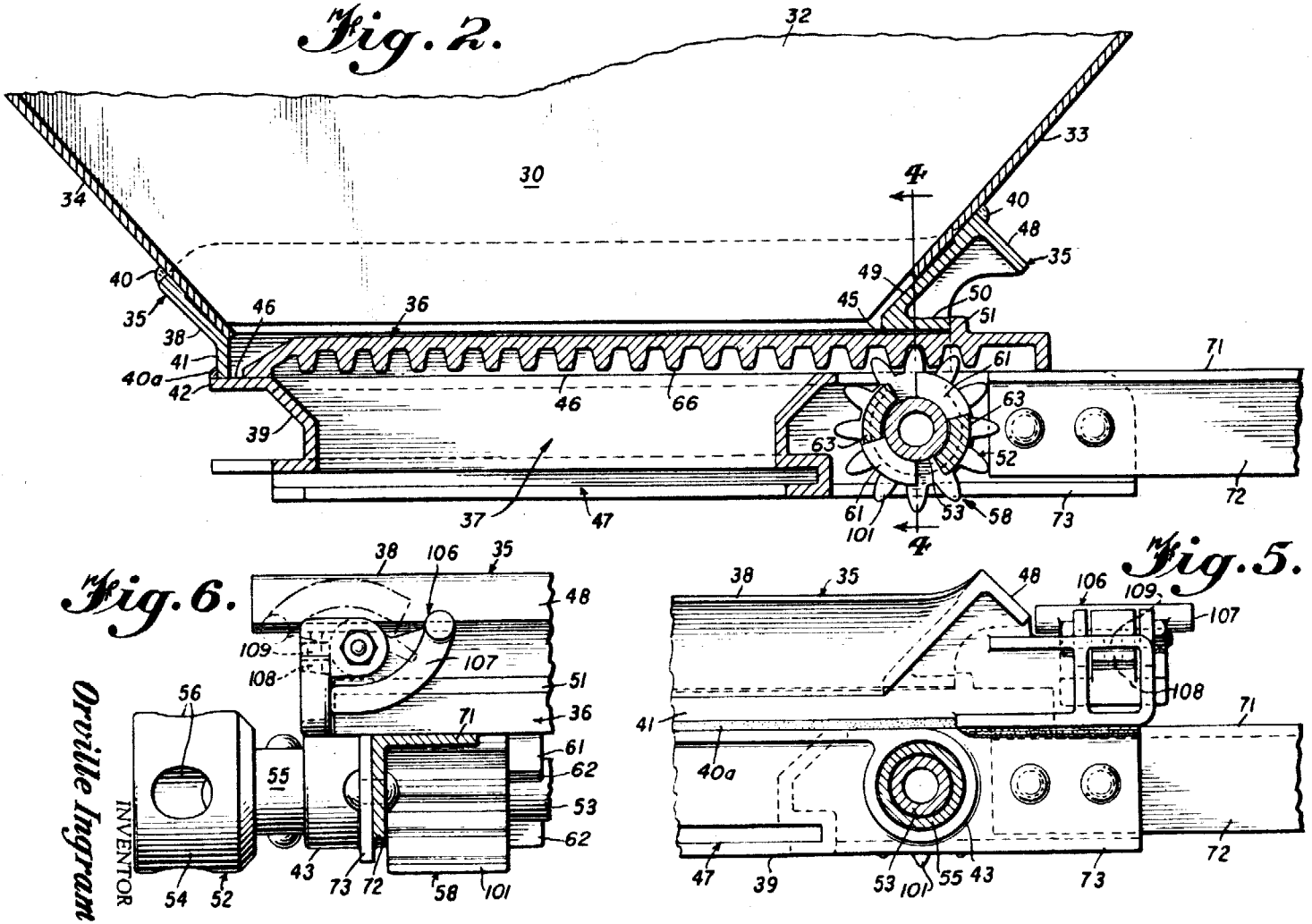

DISCHARGE GATE OPERATING ASSEMBLY

Original Filed Dec. 9, 1957 8 Sheets-Sheet 3

INVENTOR
Orville Ingram

DISCHARGE GATE OPERATING ASSEMBLY

Original Filed Dec. 9, 1957 8 Sheets-Sheet 4

INVENTOR
Orville Ingram

DISCHARGE GATE OPERATING ASSEMBLY
Original Filed Dec. 9, 1957 8 Sheets-Sheet 5
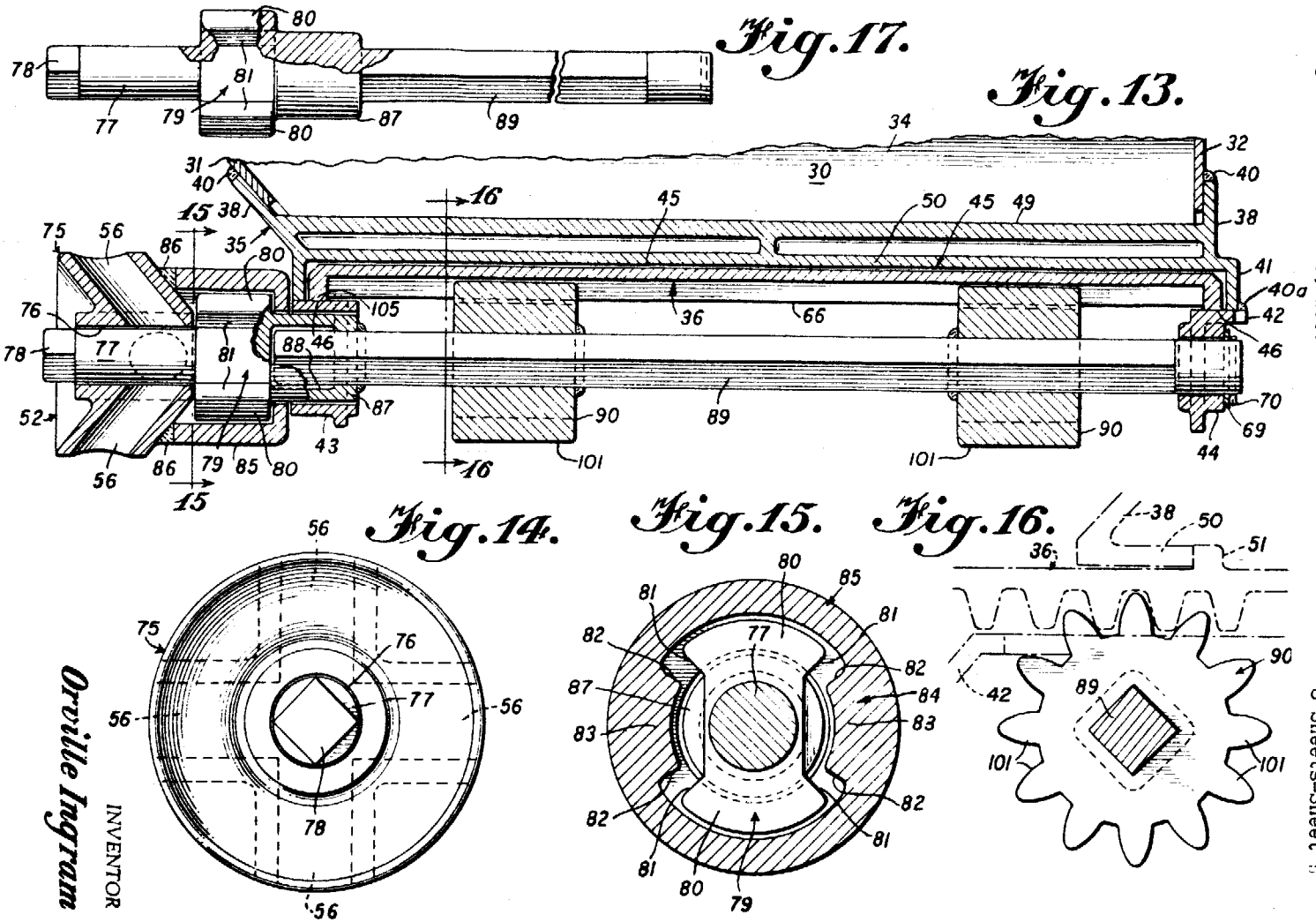

DISCHARGE GATE OPERATING ASSEMBLY

Original Filed Dec. 9, 1957 8 Sheets-Sheet 6

INVENTOR

Orville Ingram

DISCHARGE GATE OPERATING ASSEMBLY

Original Filed Dec. 9, 1957 8 Sheets-Sheet 7

INVENTOR
Orville Ingram

DISCHARGE GATE OPERATING ASSEMBLY

Original Filed Dec. 9, 1957 8 Sheets-Sheet 8

INVENTOR
Orville Ingram

United States Patent Office

Re. 26,093
Reissued Oct. 11, 1966

26,093

DISCHARGE GATE OPERATING ASSEMBLY

Orville Ingram, Toledo, Ohio, assignor to Unitcast Corporation, Toledo, Ohio, a corporation of Ohio Original No. 3,110,270, dated Nov. 12, 1963, Ser. No. 701,489, Dec. 9, 1957. Application for reissue Mar. 29, 1965, Ser. No. 460,607
33 Claims. (Cl. 105—253)

Matter enclosed in heavy brackets [ ] appears in the original patent but forms no part of this reissue specification; matter printed in italics indicates the additions made by reissue.

My invention relates to railway freight cars of the type employed for transporting in bulk finely divided material and more particularly it relates to the discharge gate assemblies of such cars and the gate operating mechanisms of such assemblies.

Cars of this type are customarily provided with sliding discharge gates for closing the openings through which the finely divided material is adapted to discharge by gravity and the principal object of this invention is to provide strong, simple and efficient lost motion means for moving a sliding gate member, under load, when the sliding gate is seized by the weight of the load, and to start movement of the sliding gate against the seizure or adhesion of the [leading] *lading*.

In the past, it has been the practice at unloading points to start the sliding gate by the use of a hooked bar with a piece of pipe slidably mounted on the bar between two spaced stops fixed to the bar. The hooked end of the bar is placed in the conventional handhole of the gate and the pipe is moved along the bar to apply impact blows against the stops. After the gate is started and withdrawn a few inches, it may be fully withdrawn with relative ease. At some unloading points, a portable screw-operated pulley is also used, but the hooked bar is most common and with this ram-like action the jar may break the adhesive binding of the lading. It will readily be seen that ram-like action of the hooked bar is effective only to the extent of possible lessening of seizure due to jarring the entire structure, there being no localization of impactive forces, but rather an absorption of the impactive forces by the structure, generally.

Cement and other finely divided material, by common practice, is usually loaded through the roof hatches of a railway freight car of the type employed for transporting such material in bulk, by the use of a hose under air pressure. The cement, when pumped into the cars, is thoroughly mixed with air and is very fluid. The weight of the cement at this time is approximately 85 pounds per cubic foot. However, this same cement, after traveling and standing in the car, loses the air film from the finely divided particles and settles from nine to twelve inches and is then very compact. The cement in this condition weights from 93 to 95 pounds per cubic foot.

The discharge gate is located at the bottom of the lading and thus must be moved against the friction imposed by the load. Ordinarily friction is directly proportional to the normal pressure between the two surfaces. As the pressure increases to a high value, the friction does not rise as rapidly, but, when the pressure becomes abnormally high, the frictional forces increase at a rapid rate until a seizing takes place. It is this condition of seizing of the sliding gate, as well as seizing from other causes, which forms the problem which my invention solves.

A further cause of this seizure or binding in the case of cement is the result of the heat of the cement at the time of loading. Cement is loaded at the mills as it is manufactured, and at this time is very warm, or even hot, relative to the steel sides of the car. This condition causes condensation of moisture and this moisture when absorbed by the cement causes a so-called "weak cement" to form at the discharge opening and at any other point where the cement comes in contact with the steel car.

A still further cause of this binding, friction or seizing of the gate is due to the fact that the sliding gate, in effect, is a rack which is actuated by a pinion. The direction of the force the driving tooth of a pinion in such a structure exerts on the driven tooth of the rack is along the line drawn from the pitch point to the point where a pair of teeth contact. The smaller the angle of obliquity between the direction of the driving force and the horizontal plane in which the gate slides, the greater will be the component of the force in the direction to cause the driven gear to turn and the less will be the tendency to force the rack and pinion apart. Thus, in the case of a sliding gate, the larger the angle of obliquity, the less the effective opening and closing force and the greater the pressure between the gate and the lading.

Another object of this invention is to provide means having a lost motion impactive element for initially starting the sliding movement of the gate when it is in closed position to open position or to initially start sliding movement from open, or partially open, toward closed position.

A further object of this invention is to provide for a sliding gate driven by a rack and pinion mechanical movement, an assembled frame which not only mounts a lost motion impactive element for initially moving the sliding gate but has economically machined sliding groove planes easily and accurately positioned with respect to the pitch circle of the pinion and pitch line of the rack portion of the sliding gate.

Another object of this invention is to provide, for a sliding gate driven by a lost motion rack and pinion mechanical movement, a shaft for mounting a pinion and a shaft operating head which operating head is adapted to and includes an impactive element for initially moving a sliding gate when the operating head is rotatably moved.

Still another object of my invention is to provide, for a sliding gate movable to open position by the use of a rack and pinion, means for supporting the gate in operable position involving a plurality of assembled frame parts forming a sliding groove and an operating mechanism supported by the supporting means and having lost motion means for initially breaking the seizure of the gate or binding of the gate to the lading.

Yet another object of my invention is to provide a frame member which may be easily machined on the groove surfaces without the use of special machining tool heads.

A still further object of my invention is to provide an improved operating mechanism, an adaptation which may be easily applied to presently existing sliding gates.

Another object of the invention is to provide a plural-part frame for a discharge gate, the parts of which are so arranged and constructed as to enable the gate-bearing surface on the frame to be face ground during assembly of the frame.

A feature of the invention is the provision in a gate operating mechanism of a rack and pinion mechanical movement wherein at least the pinion means are stub-toothed for increased strength.

Another feature of the invention is the provision in a gate operating mechanism of a rack and pinion mechanical movement wherein the gear teeth are rough cast to take advantage of the corrosion resistance of the silicon surface of the casting.

An additional feature of the invention is the provision of a rack and pinion mechanical movement for a discharge gate wherein the gear teeth on the rack and pinion members are rough cast and engagement substantially on the pitch lines of these members nonetheless is obtained by use of an assembled frame having a face ground bearing surface co-acting with a face ground bearing on the bottom of the gate.

A further feature of my invention is the provision of a rack and pinion mechanical movement having staggered teeth on the pinion which will co-act or mesh with the teeth of a rack on a sliding gate, in cooperation with a lost motion impactive element for moving the sliding gate upon activation of the element.

Still a further feature of my invention is the provision in a discharge gate assembly of a lost motion rack and pinion mechanical movement having reinforcements on its pinions, in order that the teeth may have sufficient strength to withstand the impactive forces which they will encounter during the operation of my device.

And still a further feature of my invention is the provision in a discharge gate assembly of a rack and pinion mechanical movement wherein ribs for the teeth of the rack are adapted to contact and ride on parts of the pinion, thus maintaining the relationship of the pinion and rack along the pitch circle of each member.

*Yet another feature of the invention is the provision of means for guiding the gate against lateral movement in its longitudinal movement relative to the frame.*

Other objects and features of the invention, residing in advantageous forms, combinations and relations of parts, will hereinafter appear and be pointed out in the claims and will be illustrated in the accompanying drawings, in which:

FIGURE 2 is a longitudinal section of FIGURE 1 taken on line 2—2 showing the relationship of the slidable mounted gate and having a bottom portion formed as a rack and an operable relationship of the pinion and having an impact element and a section showing an engaging means with relation to the impact element of the floating gear;

FIGURE 5 is a partial elevational view of my frame defining discharge outlet showing the area 5—5 as outlined on FIGURE 1, the relationship of the outer portion of the sliding gate and the gate locking mechanism and car seal receiver;

FIGURE 6 is an end view of my discharge outlet showing a portion substantially as outlined on section 6—6 of FIGURE 1;

FIGURE 13 is a fragmentary longitudinal section taken on line 4—4 of FIGURE 2 but substituting another species of the impacting element, particularly that which has the impact element mounted on the operating head;

FIGURE 14 is an end view of my assembled operating head having an impact element;

FIGURE 15 is a section taken on line 15—15 of FIGURE 13;

FIGURE 16 is a phantom section taken on line 16—16 of FIGURE 13 showing the relationship of a fixed pinion on a shaft with regard to its position to the sliding gate;

FIGURE 17 is another species of the sliding shaft and impactor means, as well as a means to support an assembled gate;

Figure 1:
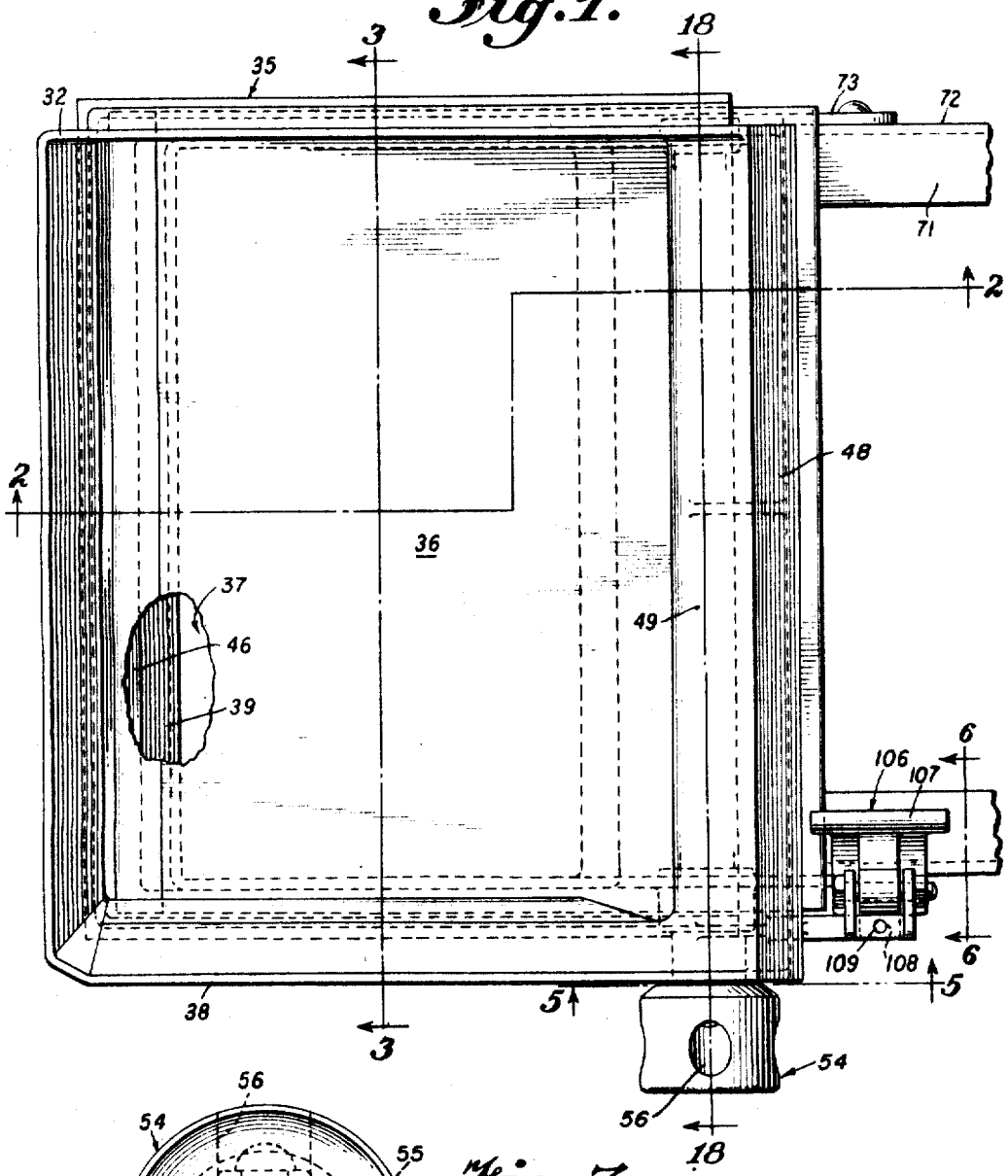
FIGURE 1 is a plan view of my discharge gate and frame showing a portion of the gate cut away to show the sealing ledge of the lower half of the frame defining discharge outlet.
Figure 7:
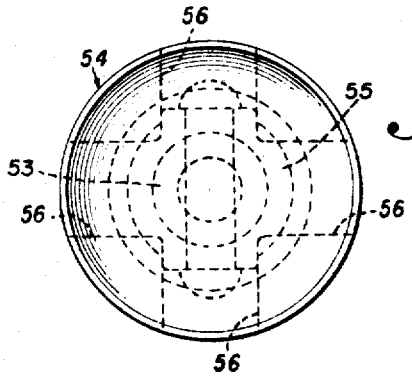
FIGURE 7 is an end elevational view of the operating head.
Figure 3:
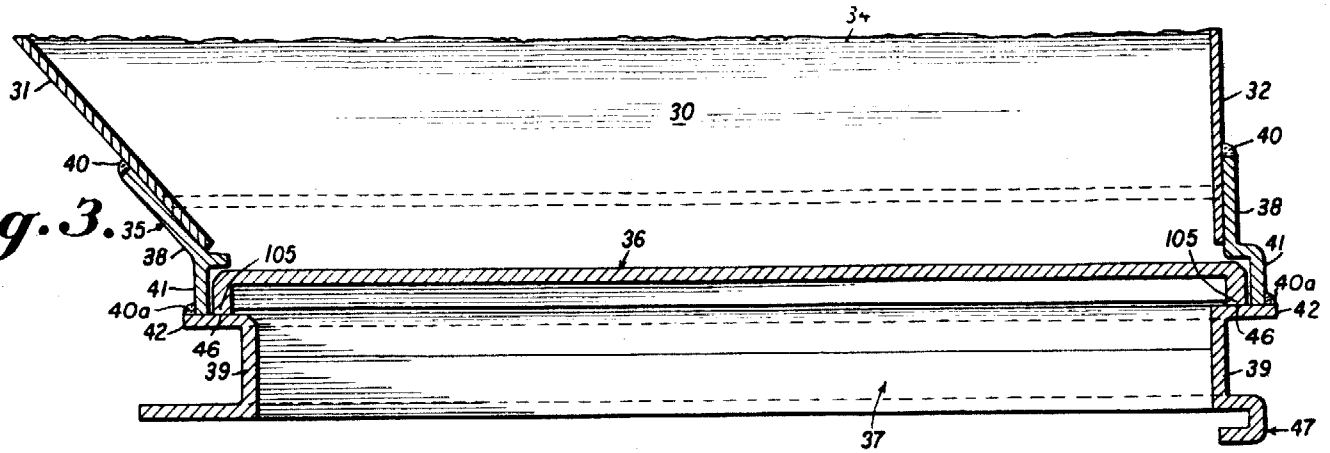
FIGURE 3 is a transverse cross section taken on line 3—3 of FIGURE 1 and showing the relationship of the upper and lower portions of the frame as disposed to the sliding gate.

Referring now in detail to the drawings in which like reference characters designate like parts, 30 indicates generally one of several of the hoppers of a railway hopper car, which conveniently may be formed by a plurality of sheets 31, 32, 33 and 34. To the lower end of these hopper sheets is secured a gate or door frame 35 defining the discharge opening of the hopper and mounting a sliding discharge gate 36. The gate frame 35 is provided with an opening 37 through which lading within the car is adapted to discharge by gravity from the hopper 30.

The gate frame 35, which is rectangular in shape to conform to the discharge end of the hopper, is preferably formed of two cast metal sections, an upper section 38 and a lower section 39. The upper section 38 of the door frame 35 is formed with a plurality of walls and preferably is attached to the adjacent portions of the hopper sheets by welding, as at 40, rather than by riveting, because it is necessary that this frame be at least seal-welded to prevent seepage of moisture into the hopper discharge zone. At their lower ends, the sides and outer end wall of the upper frame section 38 terminate in projecting flanges 41 to which the lower section 39 of the frame is secured by suitable means, such as the well 40a. The flanges 41 along the sides of the upper section 38 of the frame are vertically directed and extend or are disposed beyond the zone of the hopper opening 37 and rest on and are welded to a horizontally disposed, outwardly directed or outstanding peripheral flange 42 on the upper end of the lower section 39. The lower frame section or portion 39 is provided with journal bearings 43 and 44 for suitably journaling the operating shaft of any of the hereinafter described species of the gate-operating mechanism of this invention.

When the upper section 38 and lower section 39 of the frame 35 are in assembled relation, there is provided a slot or opening 45 in the end of the frame through which the gate 36 is moved from closed to open position. The lower frame section 39 of the frame 35 is provided with a horizontally extending edge surface 46 on which the leading edge of the gate 36 rests when in closed position. The bottom portion of the lower section of the frame is provided with the usual connecting structure indicated at 47 for adapting a canvas boot (not shown) to channel the lading to permanent storage. The upper section 38 of the frame 35 is provided, above the zone of the gate-receiving slot or opening 45, with a laterally extending portion 48 connected to the upper side portion 49 of the upper section and overlying the gate seal member 50 and, in the closed position of the gate 36, a cooperating upstanding seal element 51 on the gate whereby, with the gate closed, spray from the wheels when the car is in motion during rainy weather is deflected from the joint between the gate seal member and element.

Figure 4:
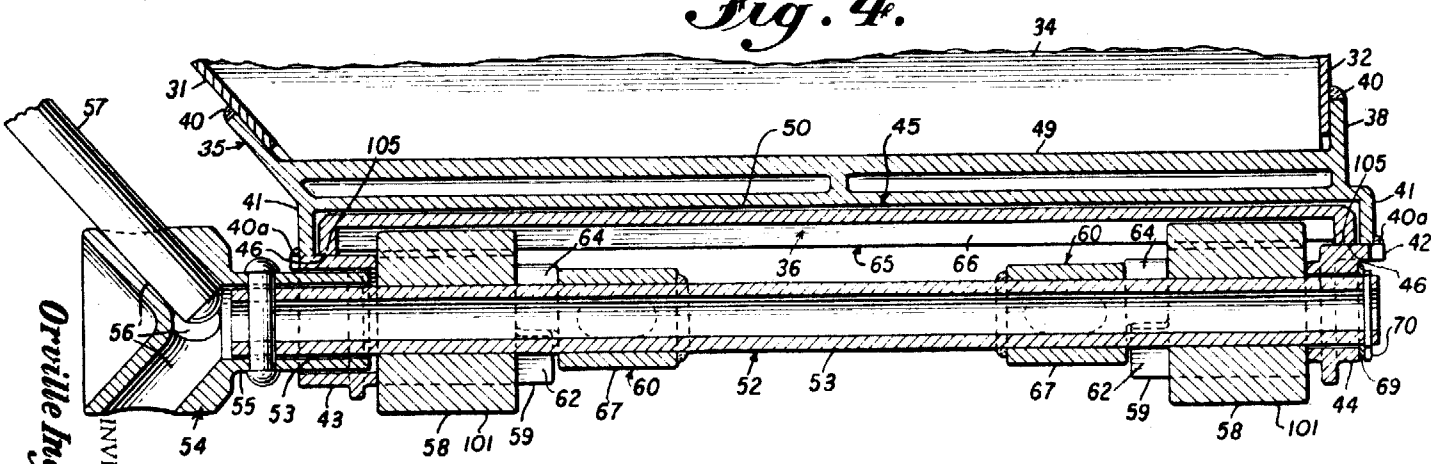
FIGURE 4 is a longitudinal section of my operating mechanism showing a floating means having an impact element engageable with a means mounted on a pipe shaft, said pipe shaft having a head for receiving an insertable operating tool, the section being taken on line 4—4 of FIGURE 2 with portions removed to more clearly illustrate certain of the details of construction.
Figure 8:
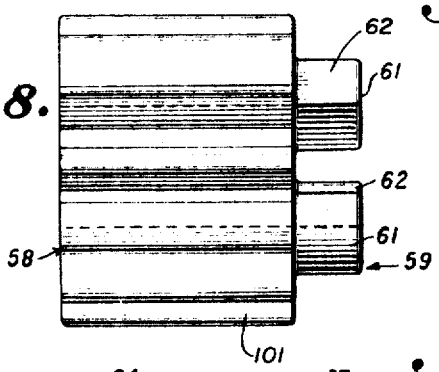
FIGURE 8 is an elevational view of a floating pinion and impactor means.
Figure 9:
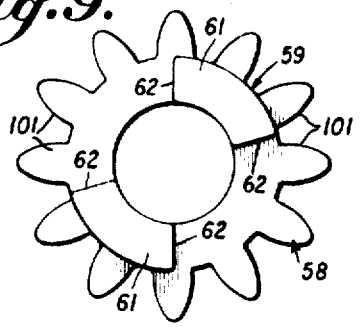
FIGURE 9 is an end view of the floating pinion and impactor means of FIGURE 8.
Figure 12:
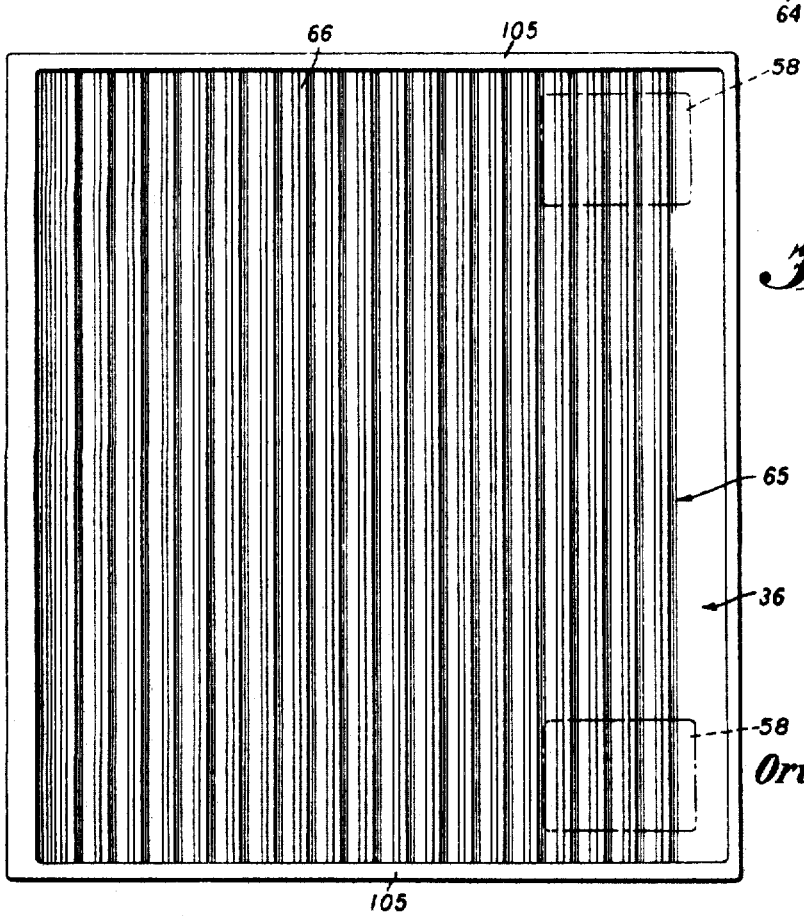
FIGURE 12 is a bottom view of the sliding gate having the bottom portion formed as a rack.
Figure 21:
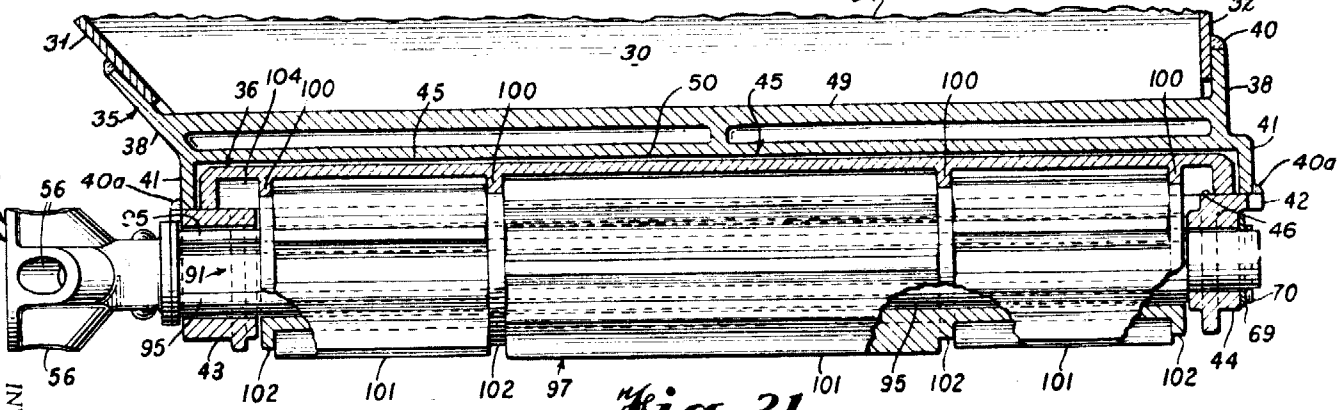
FIGURE 21 is a fragmentary section on substantially the section of FIGURE 18, of an alternate method of creating impacting forces and having a multi-rack and floating pinion.
Figure 22:
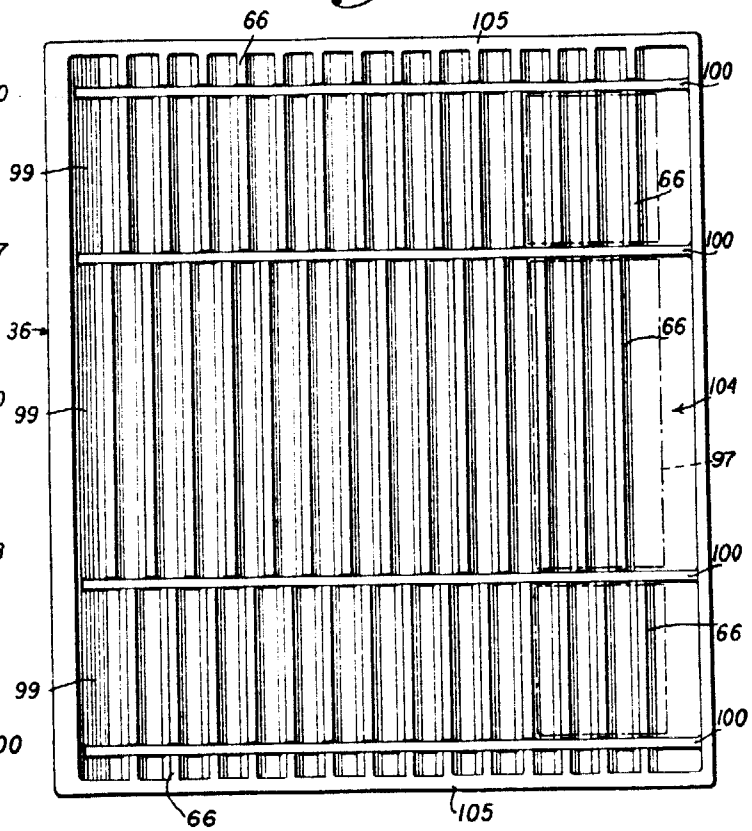
FIGURE 22 is a bottom plan view of a sliding gate formed to cooperate with a gate operating mechanism and particularly the floating pinion as shown in FIGURE 21.

Designated as 52, the gate operating mechanism, in the species of FIGURE 4, has an operating shaft 53 mounted in the journal bearings 43 and 44 of the lower frame section 39. The mechanism also includes an operating head 54 and, integral or rigid therewith, a journal or journal head 55 disposed adjacent and inwardly of the operating head, the journal being rotatably mounted in the journal bearing 43 and receiving the adjoining end of the shaft 53. The operating head 54 has lateral openings 56 to receive an insertable tool 57 and the journal 55 is fixedly mounted on the operating shaft 53. Rotatably mounted on the shaft 53 is one or preferably a plurality of floating pinions 58, the preferred plurality or pair of pinions being axially spaced and each having integral therewith or fixed thereto an impact or anvil means 59 positioned to be engaged by an associated hammer means 60 fixedly mounted on the shaft. In the preferred form, the impact or anvil means 59 has a pair of oppositely disposed, circumferentially spaced, sector-shaped or sectoral anvils or jaws 61 each presenting a pair of radially directed striking faces 62. The associated or related hammer means 60, fixed to the shaft 53, in turn has a pair of oppositely disposed circumferentially spaced, sector-shaped or sectoral hammers or heads 63 which fit between and are movable in a limited arc relative to the anvils 61 of the related anvil means 59 before their own radially directed striking faces 64 engage or strike the confronting striking faces 62 on the anvils 61. It is this rotative play or lost motion connection between each pair of hammers 63 and the related anvils 61 and the fixing of the hammer means 60 for rotation with the operating head 54 and the anvil means 59 for rotation with the pinion or pinions 58 that is employed in the operating mechanism of this invention to cause impactive forces to be transmitted to the floating pinion or pinions and therethrough to the rack 65 of the gate 36 for initially moving the gate. It can readily be seen that the floating pinions and the hammer means 60 and anvil means 59 constituting their impactor assemblies may be suited to aligned teeth 66 such as used on the rack 65 of the gate 36 of FIGURE 4 or 12 and, as well, may be adjusted to suit a staggered-toothed gate rack such as shown in FIGURE 21 or 22, the latter, of course, also requiring an additional pinion and impactor assembly for its third set of teeth.

Figure 10:
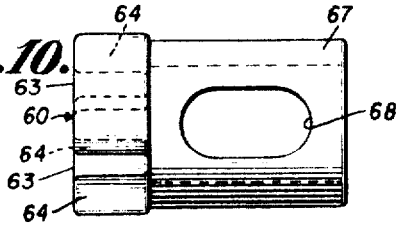
FIGURE 10 is an elevational view of the engaging means.
Figure 11:
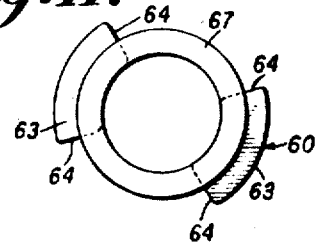
FIGURE 11 is an end view of engaging means.

As shown in FIGURES 10 and 11, the hammer means 60 of the species of FIGURE 4 are provided with an integral hub or hub portion 67 for fixedly mounting the hammer means on the shaft 53. For greater welding area, particularly adjacent the hammers 63, the hub portion 67 preferably is provided with one or more axially elongated slots 68 about which the hammer means can be welded to the shaft. In this species, the shaft 53 is a pipe or tube which extends through and is journaled in both of the bearings 43 and 44 and the entire assembly conveniently is held in place by a washer 69 and a cotter key 70 applied to the inner end of the shaft beyond the bearing 44.

Figure 20:
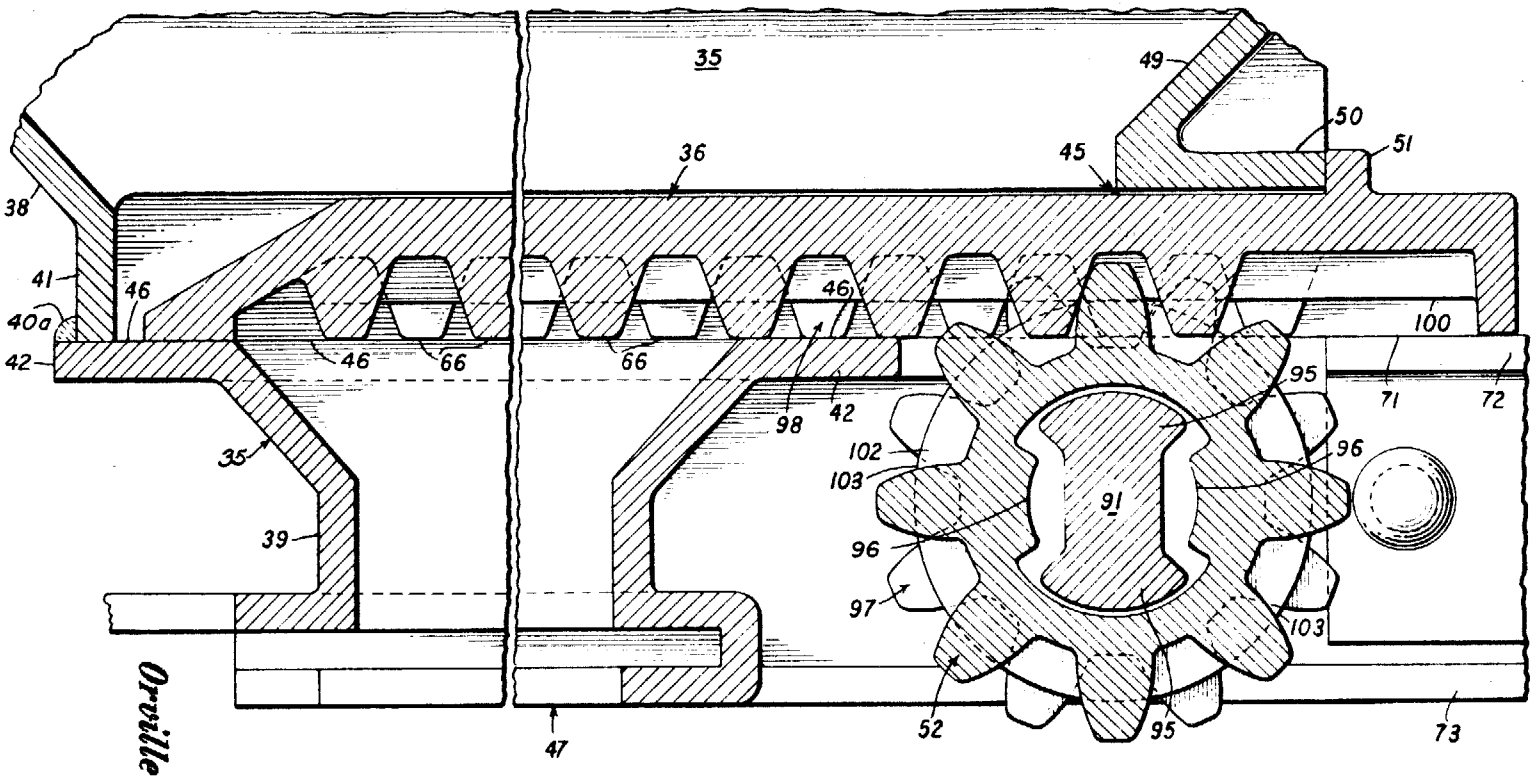
FIGURE 20 is a longitudinal section taken on line 20—20 of FIGURE 18 with the hopper removed showing relationship of the dual floating pinion and impacting element, as well as the multi-rack tooth seat at the leading opening edge of the frame.

As best shown in FIGURE 20, the horizontal peripheral flange or ledge 42 at and bounding the upper end of the lower frame section 39 extends below the gate opening 45 and over that area is of sufficient width to ensure contact with one or more of the teeth 66 of the rack 65 on the underside of the gate 36 at all times and preferably to have contact with a plurality of teeth in the closed or partially open position of the gate. When the gate 36 is moved from closed to open position, its outer portion slides on the upper faces 71 of transversely spaced angles 72 fixed at one end to and projecting outwardly from an extension 73 of the lower section 39 of the frame and at the other end to car framing (not shown). With their upper faces 71 aligned or coplanar with the upper or gate-bearing surface 46 of the peripheral flange 42 on the lower section, the angles 72 maintain the gate 36 in the same plane in both closed and open positions as well as in its movement therebetween. No problem is presented in providing the angles 72 with planar upper faces in the course of construction of the discharge gate assembly. However, in the conventional one-piece cast gate frame, the gate-bearing surface on the frame proper is not readily accessible and therefore *is* difficult to grind or machine to the required flatness. Not so in the frame of this invention, where the forming of the bearing surface 46 on the peripheral flange 42 of the lower section 39 enables the bearing surface readily to be face ground to tolerance before the upper and lower sections are joined together.

In the species of the gate operating mechanism 52 shown in FIGURES 13, 14, 15 and 16, the operating head 75 is part of an operating head assembly. Like that of the first species, the head 75 is fitted to receive the operating tool or bar 57 in lateral openings or holes 56 but otherwise is of different construction. The head 75 receives in an axial bore 76 an axle 77 on which it is rotatably mounted and the axle extends outwardly beyond the head and has a squared end 78 for optionally receiving a tool by which the entire mechanism may be rotated. Integral with and at the opposite or inner end of the axle beyond the head 75 is an anvil or impact means or member 79 having circumferentially spaced, oppositely disposed, sector-shaped anvils or jaws 80, the radially directed striking faces 81 at sides of which are adapted to be engaged and struck by striking faces 82 at sides of circumferentially spaced hammers or heads 83 between which the anvils are fitted with sufficient lost motion or play for limited relative rotary movement. However, in this species, the hammer or impact means 84 having the hammers 83 forms part of a housing 85 containing the anvil means 79 and fixed as by welding, as at 86, to and extending inwardly from the operating head 75 in axial alignment therewith. Also formed integrally with the axle 77 and at the opposite end of the anvil means 79 therefrom is a bearing member 87 coaxial with the axle and having a socket 88 for receiving the adjoining end portion of a, in this species, square operating shaft 89, the socket preferably being square-mouthed for non-rotatably receiving the shaft and the shaft and bearing member being fixed to each other, preferably by welding. The operating mechanism of this species also preferably has a pair of axially spaced pinions 90, but these pinions are square-apertured to non-rotatably mount on the shaft and each is fixed against axial movement relative thereto, as by welding. The difference in the mounting of the pinions on the operating shaft between this and the first species is, of course, the result of the positioning of the impactor assembly comprised of the anvil means 79 and hammer means 84 between the operating head and the shaft so that the impact here is transmitted through the shaft to the pinions rather than from the shaft to the pinions.

The alternate shaft structure shown in FIGURE 17 is identical with that of FIGURE 13 except that it is of one-piece construction with the bearing member 87 solid and the shaft 89 formed integrally with it.

Whether the shaft structure is that of FIGURE 13 or of FIGURE 17, the necessary number of the pinions 90 are readily applicable to and positionable along the shaft 89 to accommodate the operating mechanism to the particular rack arrangement on the gate 36 the mechanism is required to drive.

In the third main species shown in FIGURES 18–22, the gate operating mechanism 52 is similar to that of the first species in having its operating shaft 91 fixed to its operating head 92, in this case conveniently by riveting the head to a washer-carrying square projection 93 on the outer end of the shaft which fits into an aperture 94 of corresponding section extending through the head. However, in this species, the shaft, journaled in the bearings 43 and 44, is itself made part of the impactor assembly by forming integrally with it the doubleheaded hammer or jaw means 95 of that assembly and forming the associated double anvil or jaw means 96 in or internally of and integrally with a pinion 97 extending substantially the length af the shaft between the journal hearings. The lost or free motion in the drive in this case thus is between the shaft and the pinion with any movement of the pinion transmitted without lost motion to the gate 36 through the latter's rack.

Figure 18:
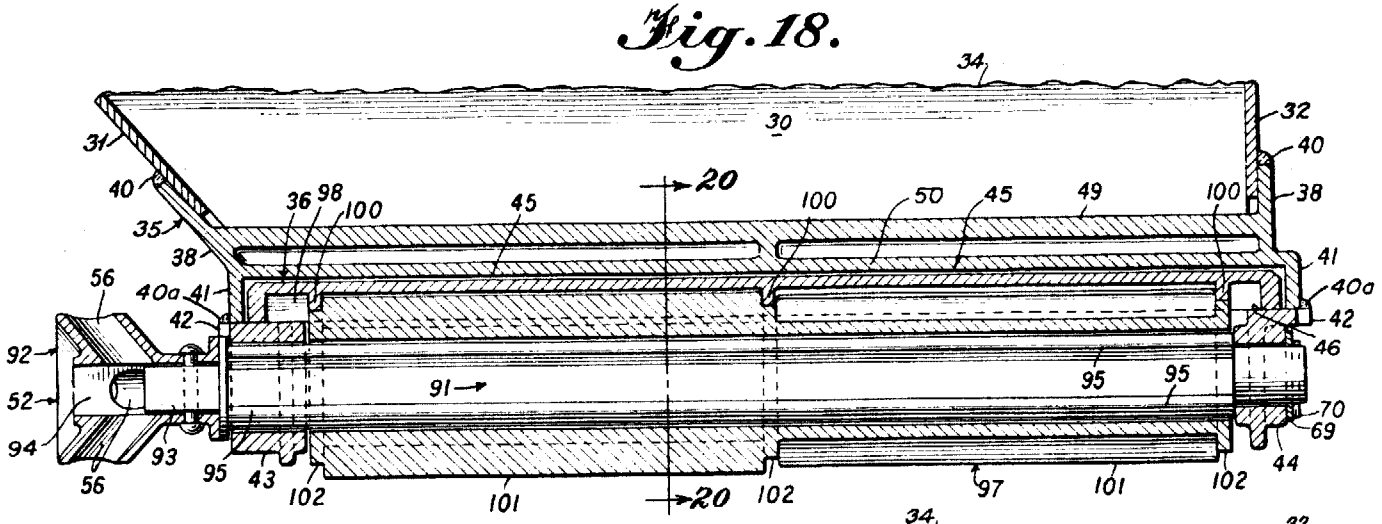
FIGURE 18 is a fragmentary longitudinal section taken on line 18—18 of FIGURE 1 but with alternate impacting elements.
Figure 19:
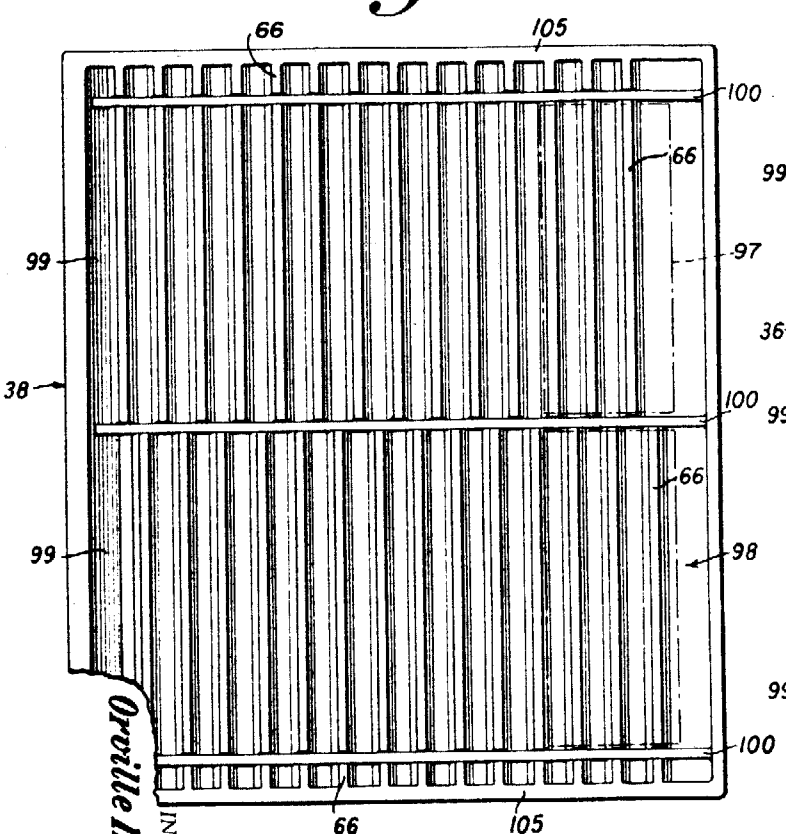
FIGURE 19 is an alternate bottom view of a sliding gate adapted to cooperate with a gate operating mechanism and particularly the floating pinion shown in FIGURE 18.

The length of the floating pinion 97 especially lends itself for driving a gate having a rack on its underside of either of the forms shown in FIGURES 19 and 22. In the form of FIGURE 19, the rack 98 has two sets or rows 99 of relatively staggered teeth 66 which are bounded at the sides by ribs or webs 100, the rib at the contiguous sides of the sets being common to both. The teeth 101 on the particular pinion 97 are correspondingly divided and staggered, each for engagement with one of the sets or rows 99 of teeth 66 on the rack 98. Each of the sets of teeth on the pinion is bounded at the sides by an annular rib or web 102 on the cylindrical periphery 103 of each of which one of the ribs 100 on the rack is adapted to ride. With this arrangement and the height of each of the ribs 100 and 102 substantially that of the roots of the adjoining teeth 66 and 101, the ribs 100 on the rack not only reinforce the teeth 66 at the sides but, by riding on the ribs 102 on the pinion 97, have rolling contact with the latter and maintain at all times the correct meshing relationship between the teeth of the rack and the pinion substantially on their pitch lines. In addition, the staggered arrangement of the teeth on the rack and pinion practically ensures that at least one tooth on the pinion will be in a meshing relation with a tooth on the rack best suited for the transmission of the impactive force to the gate 36. *Except for a minimum working clearance at its ends, there is no end or lateral play or movement of the pinion 97 of the form of either of FIGURES 18 and 21 relative to the frame 35 in which it is mounted. Thus, insofar as lateral movement relative to the frame is concerned, the teeth-interrupting slot or slots, both about the webs 102 between the teeth 101 and at the outer ends of the teeth, in which ride the ribs 100 on the underside of the gate 36, serve as laterally stationary guide slots or ways for the ribs and, in cooperation with the ribs, provide a longitudinally disposed rib-and-slot interfit or interconnection between the gate and the frame for guiding the gate against lateral movement in its longitudinal or reciprocable movement relative to the frame between open and closed positions.*

The sub-species of FIGURES 21 and 22 is identical with that of FIGURES 18–20 except that the rack 104 of FIGURE 22 has three sets of relatively staggered teeth and the teeth of the floating pinion 97 are correspondingly staggered and divided.

In each of the above species, it is preferred that the gate 36 be a unitary casting of which the rack 65, 98 or 104 is an integral part and that the pinion or pinions 58, 90 or 97 also be castings. With the preferred racks and pinions thus cast gears, it further is preferred that the intermeshing rack and pinion teeth 66 and 101, respectively, or at least the pinion teeth 101 be of such shape that the particular gear of which the teeth are a part will be what is known as a stub-toothed gear. The curves which form the outline of a pair of gears may, in theory at least, have any form whatever, provided they conform to one law, namely: the line drawn from the pitch point to the point where the teeth are in contact must be perpendicular to a line drawn drawn through the point of contact tangent to the curves of the teeth; that is, the common normal to the tooth curves at all points of contact must pass through the pitch point.

The stub-toothed gear, sometimes also known as a stub-tooth gear, was developed to obtain a stronger tooth for heavy loading, particularly at lower speeds such as obtained in the operation of the gate operating mechanism 52 of this invention. At low operating speeds, a stub-toothed gear will carry a greater load than a standard-toothed gear in the ratio of the two pitches dimensioning the stub tooth, that is, an 8–10 ratio stub tooth will take a 10–8 ratio of the load of a standard 8-pitch tooth. It therefore is advantageous that at least the pinion teeth 101 be stub rather than standard because of the greater strength ratio at the operating speeds to which the mechanism will be subjected in service.

Not only is it desirable that at least the pinions 58, 90 or 97 of the gate operating mechanism 52 to be stub-toothed, but is is highly desirable that all of the parts of the mechanism be unmachined, because practically no maintenance is economically practical in service. Particularly for the rack and pinion, it is desirable that the gear teeth 66 and 101 be not only unmatched but rough cast to take advantage of the silicon at the surface of the casting and the corrosive protection which a silicon surface affords, yet it is also desirable to have the meshing relation of the teeth of the rack and pinion maintained on their pitch lines. Protective grease or other lubricant on machined teeth would only capture the lading during unloading and create, at best, an abrasive substance or a "weak cement" in the gears. The gear teeth of the rack and pinion mechanical movement of this invention are held in engagement substantially along the pitch circle of the pinion and the pitch line of the rack by the face grinding of the bearing surface 74 on the lower section 39 of the gate frame 35 and like grinding of the bearing 105 on the underside of the gate 36 through which the latter bears or engages and slides on the bearing surface.

Under the above circumstances, the rack and pinion gear teeth 66 and 101 of the gate operating mechanism 52 are especially suited for the heavy duty work to which the mechanism will be subjected in service and to transmit and receive the impactive loads imposed to start the movement of the gate 36. For gears doing such heavy work, it has been found by experience that the maximum obliquity should not, in general, exceed 30 degrees and that, when more than one pair of teeth are in contact, a high maximum impactive force is less objectionable. It is for the latter reason that, in the species of FIGURES 18–22, the rack teeth 66 are arranged in staggered sets and the cooperating pinion teeth 101 are correspondingly staggered such that at least two pairs of teeth will be in contact at all times. Conventional sliding gates, having aligned teeth and driven by a plurality of standard straight-line toothed pinions, can be rendered unworkable by misengagement of the intermeshing teeth; that is, one tooth of one pinion will get in the advanced tooth position of the rack, while the engaged tooth of the other pinion remains in its initial position relative to the rack teeth. This condition causes the sliding gate to bind on the side of the gate frame. With the rack teeth of the species of FIGURES 18–22 staggered and the correspondingly staggered pinion teeth on the floating pinion 97 extending the lengths of the rack teeth, it is practically impossible for this misengagement condition to exist.

As in a conventional slide gate assembly, the slide gate 36 must be lockable in closed position to prevent accidental opening. As shown in FIGURE 6, this is accomplishable by pivotally mounting on the upper frame section 38 a locking means 106 having a rotatable member 107 for locking the sliding gate in its innermost or closed position. The rotatable member 107 conveniently may be in the form of a cam, as clearly shown in FIGURES 5 and 6. The rotatable member 107 has an outwardly extending tail-like portion having an opening 108 alignable with an opening 109 in the upper frame section 38 through which a car seal (not shown) may be placed to discourage unauthorized persons from tampering with the operation of the mechanism. In preventing withdrawal of the sliding gate 36, the rotatable member 107, when in locking position, is disposed in the path of movement of the confronting outer end of the gate. Thus, to open the gate, the rotatable member must be moved and any substantial movement of it will break a car seal placed in the aligned openings or seal retainers 108 and 109.

From the foregoing detailed description, it will be perceived that, among its other advantages, the discharge gate assembly of this invention provides a simple, reliable and rugged means for breaking any adhesion between the gate and the lading supported by it so that the operating mechanism itself is enabled to initiate the movement of the sliding gate between open and closed positions.

I claim:

1. In a closure assembly for a discharge outlet defined by a frame, a gate slideably mounted on said frame for closing said outlet, rack means on said gate, a shaft rotatably mounted on said frame, pinion means on said shaft and engaging said rack means, and impact means connected to said shaft and rotatable relative to said pinion means, said impact means being lost motion connected to said pinion means for enabling rotation of said impact means in a gate moving direction to apply an impactual force to and initiate movement of said gate.

2. In a railway hopper car having a frame defining a discharge outlet, a gate slideably mounted on said frame for closing said outlet, rack means on said gate, a shaft rotatably mounted on said frame, pinion means on said shaft and engaging said rack means, and impact means connected to said shaft and rotatable relative to said pinion means, said impact means being lost motion connected to said pinion means for enabling rotation of said impact means in a gate moving direction to apply an impactual force to and initiate movement of said gate.

3. In a railway hopper car having a frame defining a discharge outlet, a gate slideably mounted on said frame for closing said outlet, a shaft rotatably mounted on said frame, rack means on said gate, pinion means carried by said shaft and engaging said rack means, an operating head connected to said shaft and rotatable relative to said pinion means, and lost motion impact means interposed between and limiting relative rotation of said head and pinion means, said lost motion impact means on rotation of said head in a gate moving direction applying an impactual force to and initiating movement of said gate.

4. In a railway hopper car having a frame defining a discharge outlet, a gate slideably mounted on said frame for closing said outlet, a shaft rotatably mounted on said frame, rack means integral with said gate, pinion means carried by said shaft and engaging said rack means, an operating head connected to said shaft and rotatable relative to said pinion means, and lost motion impact means interposed between and limiting relative rotation of said head and pinion means, said lost motion impact means on rotation of said head in a gate moving direction applying an impactual force to and initiating movement of said gate.

5. In a railway hopper car having a frame defining a discharge outlet, a gate slideably mounted on said frame for closing said outlet, rack means on said gate, a shaft rotatably mounted on said frame, pinion means on said shaft and engaging said rack means, an operating head connected to said shaft outwardly of and rotatable relative to said pinion means, impact means rotatable with said head and impact means rotatable with said pinion means and lost motion connected to said first-named impact means for limiting relative rotation between said head and pinion means and enabling rotation of said head in a gate-moving direction to apply an impactual force to and initiate movement of said gate.

6. In a railway hopper car, the combination of a frame defining a discharge outlet, a gate slideably mounted in said frame for closing said outlet, a rack on said gate, a pinion element meshing with said rack and rotatable to move said gate, an operating head rotatable relative to said pinion, and mechanical means operatively connecting and positioned between said head and pinion, said mechanical means including hammer means rotatable with said head and anvil means rotatable with said pinion and lost motion connected to said hammer means for limiting relative rotation of said head and pinion and enabling rotation of said head in a gate moving direction to apply an impactual force to and initiate movement of said gate.

7. In a railway hopper car, the combination of a frame defining a discharge outlet, a gate slideably mounted in said frame for closing said outlet, a rack on said gate, a pinion element meshing with said rack and rotatable to move said gate, an operating head element rotatable relative to said pinion element, and mechanical means operatively connecting and positioned between said elements, said mechanical means including a shaft rotatably supported on said frame and fixed to one of said elements, impact means fixed to said shaft, and impact means fixed to said other element and lost motion connected to said first-named impact means for limiting relative rotation of said elements and enabling rotation of said head element in a gate moving direction to apply an impactual force to and initiate movement of said gate.

8. In a railway hopper car, the combination of a frame defining a discharge outlet, a gate slideably mounted in said frame for closing said outlet, a rack on said gate, a pinion element meshing with said rack and rotatable to move said gate, an operating head element rotatable relative to said pinion element and positioned laterally outwardly of a margin of said frame and having substantially radial openings for receiving an end of an operating bar, and mechanical means operatively connecting and positioned between said elements, said mechanical means including a shaft rotatably supported on said frame and fixed to one of said elements, impact means fixed to said shaft, and impact means fixed to said other element and lost motion connected to said first-named impact means for limiting relative rotation of said elements and enabling rotation of said head element in a gate moving direction to apply an impactual force to and initiate opening of said gate.

9. In a railway hopper car, the combination of a frame defining a discharge outlet, a gate slideably mounted in said frame for closing said outlet, a rack on said gate, a pinion element meshing with said rack and rotatable to move said gate, an operating head element positioned laterally outwardly of a margin of said frame, and mechanical means operatively connecting and positioned between said elements, said mechanical means including a shaft rotatably supported on said frame and fixed to said head element and journalling said pinion element for relative rotation between said elements, hammer means fixed to said shaft, and anvil means fixed to said pinion element and lost motion connected to said hammer means for limiting relative rotation of said elements and enabling rotation of said head element in a gate moving direction to apply an impactual force to and initiate movement of said gate.

10. In a railway hopper car having a frame defining a discharge outlet, a gate slideably mounted on said frame for closing said outlet, a rack on a bottom surface of said gate, a shaft mounted on said frame below said gate, a floating pinion journaled on said shaft and engaging said rack, hammer means fixedly mounted on said shaft, and anvil means on said pinion and lost motion connected to said hammer means for causing rotation of said shaft in an opening direction to apply an impactual force to [an] initiate movement of said gate.

11. In a railway hopper car having a frame defining a discharge outlet, a sliding gate movably mounted on said frame for closing said outlet, a rack on a bottom surface of said gate, a shaft mounted on said frame below said gate, a floating pinion journaled on said shaft and engaging said rack, an operating head fixed to said shaft, hammer means fixed to said shaft between said head and pinion and having spaced jaws, and spaced jaws on said pinion and disposed in the path of movement of and lost motion connected to said jaws of said hammer means for causing rotation of said head in a gate moving direction to apply an impactual force to and initiate movement of said gate.

12. In a railway hopper car having a frame defining a discharge outlet, a gate slideably mounted on said frame for closing said outlet, a rack on a bottom surface of said gate, a shaft mounted on said frame below said gate, a floating pinion journaled on said shaft and engaging said rack, an operating head fixed to said shaft, impact means fixedly mounted on said shaft between said head and pinion, and means on said pinion and disposed in the path of movement of and lost motion connected to said impact means for limiting relative rotation of said head and pinion and causing rotation of said head in a gate moving direction to apply an impactual force to and initiate movement of said gate.

13. In a railway hopper car having a frame defining a discharge outlet, a gate slideably mounted on said frame for closing said outlet, rack means on said gate, and a gate operating mechanism comprising a shaft rotatably mounted on said frame, a floating pinion journaled on said shaft, means on said pinion and cooperating with means on said rack means for positioning said pinion to operatively engage said rack means, an operating head fixed to said shaft, impact means rotatable with said shaft and disposed thereon between said head and pinion, and means rotatable with said pinion and lost motion connected to said impact means for enabling rotation of said head in a gate moving direction to impart an impactual force to and initiate movement of said gate.

14. In a railway hopper car having a frame defining a discharge outlet, a gate slideably mounted on said frame for closing said outlet, rack means on a bottom surface of and extending substantially across said gate, a shaft rotatably mounted on said frame, a floating pinion journaled on said shaft and engaging and of substantially the same width as said rack means, impact means fixed to said shaft and impact means fixed to said pinion and lost motion connected to said first-named impact means for limiting relative rotation of said shaft and pinion and enabling rotation of said shaft in a gate moving direction to apply an impactual force to and initiate movement of said gate.

15. In a railway hopper car having a frame defining a discharge outlet, a gate slideably mounted on said frame for closing said outlet, a rack on said gate, a shaft rotatably mounted on said frame, a floating pinion journaled on said shaft and engaging said rack, an operating head connected to said shaft and rotatabl relative to said pinion, lost motion impact means interposed between said head and pinion for limiting relative rotation therebetween and enabling rotation of said head in a gate moving direction to apply an impactual force to and initiate movement of said gate, rib means for the teeth of the rack, and rib means for the teeth of the pinion, said rib means on each of said rack and pinion being substantially the height of roots of the teeth thereof and so positioned relatively that upon movement of said pinion the rib means thereof will be in rolling engagement with the rib means of the rack and cause said rack and pinion teeth to engage substantially on the pitch lines thereof when said impactual force is applied to said gate.

16. In a railway hopper car having a frame defining a discharge outlet, a gate slideably mounted on said frame for closing said outlet, a rack on said gate, a shaft rotatably mounted on said frame, a floating pinion journaled on said shaft and engaging said rack, an operating head fixed to said shaft, lost motion impact means interposed between said head and pinion for enabling rotation of said head in a gate moving direction to apply an impactual force to and initiate movement of said gate, and rib means on and disposed substantially the height of roots of the teeth of said rack for strengthening said rack teeth to withstand said impactual force.

17. In a railway hopper car having a frame defining a discharge outlet, a gate slideably mounted on said frame for closing said outlet, a rack on said gate, a shaft rotatably mounted on said frame, a floating pinion journaled on said shaft and engaging said rack, an operating head fixed to said shaft, lost motion impact means interposed between said head and pinion for enabling rotation of said head in a gate moving direction to apply an impactual force to and initiate movement of said gate, and rib means on and disposed substantially the height of roots of the teeth of said pinion for strengthening said pinion teeth to withstand said impactual force.

18. In a railway hopper car having a frame defining a discharge outlet, a gate slideably mounted on said frame for closing said outlet, dual and spaced apart relatively staggered rows of teeth forming a dual rack integral with said gate, a shaft rotatably mounted on said frame, a floating pinion journaled on said shaft and having relatively staggered sets of teeth at least one tooth of which is in coactive contact at all times with a tooth of said dual rack, impact means fixed to said shaft, and impact means rotatable with said pinion means and lost motion connected to said first-named impact means for limiting relative rotation of said shaft and pinion means and enabling rotation of said shaft in a gate moving direction to apply an impactual force to and initiate movement of said gate.

19. In a railway hopper car having a frame defining a discharge outlet, a gate slideably mounted on said frame for closing said outlet, a multiplicity of rows of teeth on said gate and together forming a multiple rack, said rows including a centrally positioned row staggered relative to outer rows, a floating pinion journaled on said shaft and having a multiplicity of sets of teeth in matching relation to the rows of teeth on said gate, at least one tooth of said floating pinion being in coactive contact at all times with a tooth of said rack, impact means fixed to said shaft, and impact means rotatable with said pinion means and lost motion connected to said first-named impact means for limiting relative rotation of said shaft and pinion means and enabling rotation of said shaft in a gate moving direction to apply an impactual force to and initiate movement of said gate.

20. In a railway hopper car having a frame defining a discharge outlet, a gate slideably mounted on said frame for closing said outlet, rack means on said gate, and a gate operating mechanism comprising a shaft rotatably mounted on said frame, floating pinion means journaled on said shaft and engaging said rack means, impact means integral with said shaft, and means integral with and internally of said floating pinion and having faces disposed in the path of movement of and lost motion connected to faces of said impact means for enabling rotative movement of said shaft in a gate moving direction to impart an impactual force to and initiate movement of said gate.

21. In a railway hopper car having a frame defining a discharge outlet, a gate slideably mounted on said frame for closing said outlet, rack means on said gate, a shaft journaled on said frame, floating pinion means journaled on said shaft and engaging said rack means, impact means fixed to said shaft and disposed within said pinion means, and means on said pinion means and disposed in the path of movement of and lost motion connected to said impact means for enabling rotation of said shaft in a gate moving direction to impart an impactual force to and initiate movement of said gate.

22. In a railway hopper car having a frame defining a discharge outlet, a gate slideably mounted on said frame for closing said outlet, a rack integral with and formed on a bottom surface of said gate, and a gate operating mechanism comprising a shaft journaled on said frame below said gate, a floating pinion journaled on said shaft and engageable with said rack, impact means on and rotatable with said shaft, and internally positioned means on said pinion and disposed in the path of movement of and lost motion connected to said impact means for enabling rotation of said shaft in a gate moving direction to impart an impactual force to and initiate movement of said gate.

23. In a railway hopper car having a frame defining a discharge outlet, a gate slideably mounted on said frame for closing said outlet, a rack on said gate, a shaft journaled on said frame, and a gate operating mechanism comprising a floating pinion journaled on said shaft and engaging said rack, impact means on and rotatable with said shaft and having spaced heads, and spaced and laterally positioned jaws on said pinion disposed in the path of movement of and lost motion connected to said heads for enabling rotation of said shaft in a gate moving direction to apply an impactual force to and initiate movement of said gate.

24. In a railway hopper car having a frame defining a discharge outlet, a gate slideably mounted on said frame for closing said outlet, rack means on said gate, a shaft rotatably mounted on said frame, pinion means on and rotatable with said shaft and engaging said rack means, and operating head positioned outwardly of said frame and connected for relative rotation to said shaft, a housing fixed to said head and disposed therebetween and said frame, impact means in and rotatable with said housing, and impact means rotatable with said shaft, said second-named impact means projecting into said housing and being lost motion connected to said first-named impact means for limiting relative rotation of said head and shaft and enabling rotation of said head in a gate moving direction to apply an impactual force to and initiate movement of said gate.

25. In a railway hopper car having a frame defining a discharge outlet, a gate slideably mounted on said frame for closing said outlet, rack means on said gate, a shaft rotatably mounted on said frame, and a gate operating mechanism comprising pinion means fixed to said shaft and engaging said rack means, an operating head journaled on and rotatable relative to said shaft, impact means fixed to said head, and impact means fixed to said shaft and lost motion connected to said first-named impact means for limiting relative rotation of said head and shaft and enabling rotation of said head in a gate moving direction to apply an impactual force to and initiate movement of said gate.

26. In a railway hopper car having a frame defining a discharge outlet, a gate slideably mounted on said frame for closing said outlet, rack means on said gate, a shaft rotatably mounted on said frame, and a gate operating mechanism comprising pinion means fixed to said shaft and engaging said rack means, means fixed to said shaft and including impact means, an operating head journaled for relative rotation on said fixed means, and impact means fixed to said head and lost motion connected to said first-named impact means for limiting relative rotation of said head and pinion means and enabling rotation of said head in a gate moving direction to apply an impactual force to and initiate movement of said gate.

27. In a railway hopper car having a frame defining a discharge outlet, a gate slideably mounted on said frame for closing said outlet, rack means on said gate, a shaft rotatably mounted on said frame, and a gate operating mechanism comprising pinion means fixed to said shaft and engaging said rack means, impact means integral with said shaft, an operating head journaled for relative rotation on said shaft, and impact means fixed to said head and lost motion connected to said first-named impact means for limiting relative rotation of said head and shaft and enabling rotation of said head in a gate moving direction to apply an impactual force to and initiate movement of said gate.

28. In a railway hopper car, a frame defining a discharge outlet and having upper and lower portions, a shaft rotatably mounted on said lower portion, an upper surface on said lower portion, a slide gate for closing said outlet and supported on and having a bearing surface slideably engaging said upper surface of said lower portion, rack means on said gate, a floating pinion journaled on said shaft, impact means fixed to said shaft, and impact means fixed to said pinion and lost motion connected to said first-named impact means for limiting relative rotation of said shaft and pinion and enabling rotation of said shaft in a gate moving direction to apply an impactual force to and initiate movement of said gate, said bearing surface on said gate being finish-positioned relative to the teeth of said rack means, said upper surface being finish-positioned with respect to the axis of said shaft and pinion, and said finish-positioning of said surfaces being such as to cause the teeth of said pinion and rack means to engage on the pitch lines of said rack teeth and pitch circle of said pinion.

29. In a railway hopper car, a frame defining a discharge outlet, said frame including initially separate upper and lower portions and means securing said portions, a shaft rotatably mounted on said lower portion, an upper surface on said lower portion, a slide gate for closing said outlet and supported on and having a bearing surface slideably engaging said upper surface of said lower portion, rack means on said gate, a floating pinion journaled on said shaft, impact means fixed to said shaft, and impact means fixed to said pinion and lost motion connected to said first-named impact means for limiting relative rotation of said shaft and pinion and enabling rotation of said shaft in a gate moving direction to apply an impactual force to and initiate movement of said gate, said bearing surface on said gate being ground-positioned the teeth of said rack means, said upper surface being ground-positioned with respect to the axis of said shaft and pinion, and said ground-positioning of said surfaces being such as to cause the teeth of said pinion and rack means to engage on the pitch lines of said rack teeth and pitch circle of said pinion.

30. In a discharge gate assembly for a hopper, a gate frame defining a discharge outlet, comprising separately cast upper and lower parts, an upper bearing surface on said lower part and face ground to tolerance, means securing said lower part to said upper part, a sliding gate for closing said outlet and slideably supported on said bearing surface, rack means on said gate, and a gate operating mechanism mounted on said lower part, said mechanism including a shaft rotatably mounted on said lower part, an operating head connected to said shaft, pinion means mounted on said shaft for rotation relative to said head and engaging said rack means, impact means rotatable with said head, and impact means rotatable with said pinion means and lost motion connected to said first-named impact means for limiting relative rotation of said head and pinion means and enabling rotation of said head in a gate moving direction to apply an impactual force to and initiate movement of said gate.

*31. In a railway hopper car discharge gate assembly having a frame and a slide gate movable longitudinally therein between open and closed positions, the combination of laterally stationary slot means on said frame below and disposed longitudinally of and opening upwardly toward said gate, and rib means fixed to an underface of said gate and extending longitudinally thereof and inter-*

*fitting with same slot means for guiding said gate in its longitudinal movement relative to said frame.*

*32. In a railway hopper car discharge gate assembly having a frame and a slide gate movable longitudinally therein between open and closed positions, the combination of laterally stationary slot means on said frame and disposed longitudinally of and normal to a face of said gate, and rib means fixed to and extending longitudinally of said face of said gate and projecting therefrom normal thereto into said slot means for guiding said gate in its longitudinal movement relative to said frame.*

*33. In a railway hopper car discharge gate assembly having a frame surrounding a hopper opening, a slide gate longitudinally movable in said frame between open and closed positions, rack means on and extending longitudinally of said gate and pinion means mounted on and extending laterally of said frame and engaging said rack means for driving said gate between open and closed positions, the combination of guide slot means interrupting and disposed radially of said pinion means, and rib means interrupting and extending longitudinally of said rack means and interfitting with said guide slot means for guiding said gate in its longitudinal movement relative to said frame.*

References Cited by the Examiner

The following references, cited by the Examiner, are of record in the patented file of this patent or the original patent.

UNITED STATES PATENTS

| | | | |
|---|---|---|---|
| 528,279 | 10/1894 | Roberts | 105—311 XR |
| 602,239 | 4/1898 | De Palacio | 104—109 |
| 724,346 | 3/1903 | Smith | 222—505 |
| 729,266 | 5/1903 | Brenzinger | 298—27 |
| 1,021,351 | 3/1912 | Christianson | 105—311 X |
| 1,035,439 | 8/1912 | Hillman | 105—299 |
| 1,072,488 | 9/1913 | Nichols | 74—460 |
| 1,122,918 | 12/1914 | Hart et al. | 105—282 X |
| 1,138,950 | 5/1915 | Henderson | 105—305 X |
| 1,295,246 | 2/1919 | Weaver | 105—290 |
| 1,415,097 | 5/1922 | Kassler | 105—250 |
| 1,442,902 | 1/1923 | O'Connor | 105—311 |
| 1,623,303 | 4/1927 | Burnett | 105—282 |
| 1,715,307 | 5/1929 | Porter | 105—282 |
| 2,072,292 | 3/1937 | Campbell | 105—282 |
| 2,222,280 | 11/1940 | Batho | 105—282 |
| 2,317,007 | 4/1943 | Weniger | 222—542 |
| 2,386,702 | 10/1945 | McBride | 105—282 |
| 2,482,516 | 9/1949 | Sheesley | 105—308 |
| 2,579,382 | 12/1951 | Gattiker et al. | 287—119 |
| 2,638,060 | 5/1953 | Dorey | 105—282 |
| 2,749,770 | 6/1956 | Dorey | 105—305 X |
| 2,750,074 | 6/1956 | Dorey | 105—282 X |
| 2,753,815 | 7/1956 | Dorey | 105—282 |
| 2,778,319 | 1/1957 | Dorey | 105—282 |
| 2,810,355 | 10/1957 | Dath | 105—308 |
| 2,859,707 | 11/1958 | Dorey | 105—253 |
| 2,862,400 | 12/1958 | D'Angelo | 105—305 X |
| 2,898,871 | 8/1959 | Dath | 105—253 |
| 2,989,931 | 6/1961 | Joy | 105—282 |
| 3,066,618 | 12/1962 | Gunnison | 105—305 X |

FOREIGN PATENTS

| | | |
|---|---|---|
| 824,804 | 12/1951 | Germany. |

ARTHUR L. LA POINT, *Primary Examiner.*

H. BELTRAN, *Assistant Examiner.*